United States Patent
Faden et al.

(10) Patent No.: US 8,927,088 B2
(45) Date of Patent: Jan. 6, 2015

(54) HELMET DESIGNS UTILIZING FOAM STRUCTURES HAVING GRADED PROPERTIES

(75) Inventors: Alan Ira Faden, Baltimore, MD (US); Thomas E. Twardowski, Jr., Morrisville, PA (US)

(73) Assignee: KineticShield, Inc., Doylestown, PA (US)

( * ) Notice: Subject to any disclaimer, the term of this patent is extended or adjusted under 35 U.S.C. 154(b) by 624 days.

(21) Appl. No.: 13/267,551

(22) Filed: Oct. 6, 2011

(65) Prior Publication Data

US 2012/0207964 A1 Aug. 16, 2012

Related U.S. Application Data

(60) Provisional application No. 61/442,469, filed on Feb. 14, 2011.

(51) Int. Cl.
| | | |
|---|---|---|
| *B32B 1/00* | (2006.01) | |
| *A42B 1/08* | (2006.01) | |
| *A42B 3/06* | (2006.01) | |
| *A41D 31/00* | (2006.01) | |
| *B32B 5/14* | (2006.01) | |
| *B32B 7/02* | (2006.01) | |
| *F41H 1/04* | (2006.01) | |
| *F41H 5/04* | (2006.01) | |
| *B32B 3/12* | (2006.01) | |
| *B32B 3/26* | (2006.01) | |

(52) U.S. Cl.
CPC .............. *A42B 3/063* (2013.01); *A41D 31/005* (2013.01); *B32B 1/00* (2013.01); *B32B 5/145* (2013.01); *B32B 7/02* (2013.01); *F41H 1/04* (2013.01); *F41H 5/0492* (2013.01); *B32B 3/12* (2013.01); *B32B 3/26* (2013.01); *B32B 2307/56* (2013.01); *B32B 2437/04* (2013.01)

USPC .......... 428/178; 428/166; 428/172; 428/217; 428/218; 2/411; 2/412; 2/425

(58) Field of Classification Search
CPC .............. B32B 3/12; B32B 3/18; B32B 3/20; B32B 3/26; B32B 5/145; B32B 7/02; B32B 2037/56; B32B 2437/04; B32B 2037/266; A41D 31/005; A42B 3/063; F41H 1/04; F41H 5/0492
USPC ................. 428/156, 166, 172, 178, 217, 218; 2/411, 412, 413, 425
See application file for complete search history.

(56) References Cited

U.S. PATENT DOCUMENTS

| | | |
|---|---|---|
| 5,815,846 A | 10/1998 | Calonge |
| 6,012,178 A | 1/2000 | Schuster et al. |

(Continued)

FOREIGN PATENT DOCUMENTS

WO WO 2010/019609 2/2010

*Primary Examiner* — Donald J Loney

(57) ABSTRACT

Disclosed herein is a composite structure for deflecting and spreading kinetic energy transmission after various types of impacts utilizing foam structures having graded properties. The structure has a first composite layer, composed of a discrete reinforcement and a continuous binder. The helmet receives contact of an object that transfers kinetic energy to a first composite layer. The helmet uses a second composite layer adjacent to the first composite layer designed such that the second composite layer compresses and expands into an expansion zone in the second composite layer. The second composite layer has expansion structures with a graded modulus such that the material at the tip of an expansion structure has a low modulus and the modulus in the expansion structure increases as it moves from the tip to the base of the expansion structure.

12 Claims, 5 Drawing Sheets

(56) References Cited

U.S. PATENT DOCUMENTS

| | | | |
|---|---|---|---|
| 6,682,128 B2 * | 1/2004 | Carroll et al. | 296/187.03 |
| 2004/0117896 A1 | 6/2004 | Madey et al. | |
| 2005/0217767 A1 | 10/2005 | Barvosa-Carter et al. | |
| 2006/0059605 A1 | 3/2006 | Ferrara | |
| 2006/0059606 A1 | 3/2006 | Ferrara | |
| 2006/0269738 A1 | 11/2006 | Kimberly | |
| 2007/0107778 A1 | 5/2007 | Bettin et al. | |
| 2009/0266663 A1 * | 10/2009 | Lin | 188/372 |
| 2009/0300949 A1 | 12/2009 | Frederick et al. | |
| 2010/0229271 A1 * | 9/2010 | Marissen et al. | 2/2.5 |

* cited by examiner

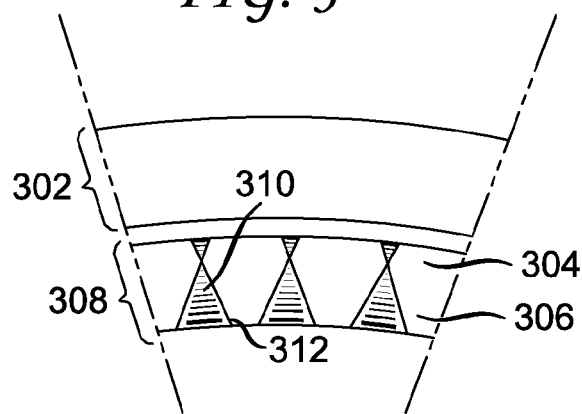
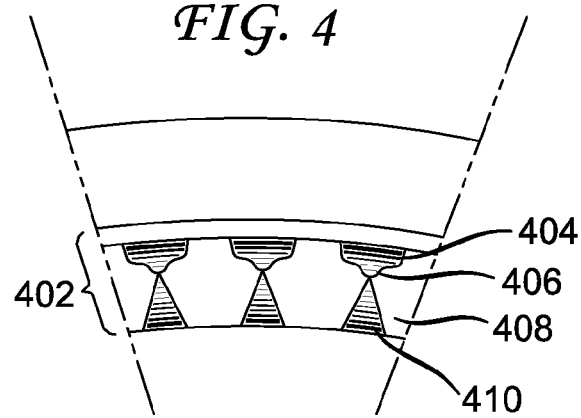
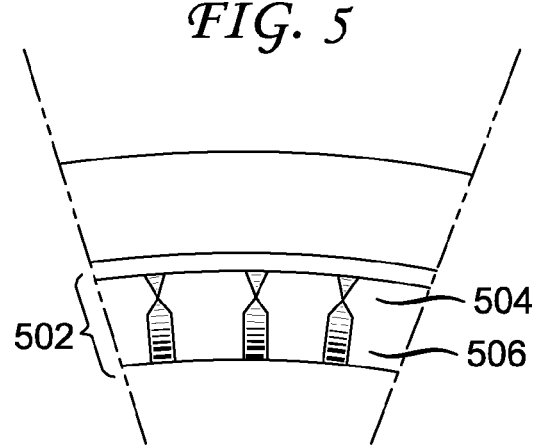

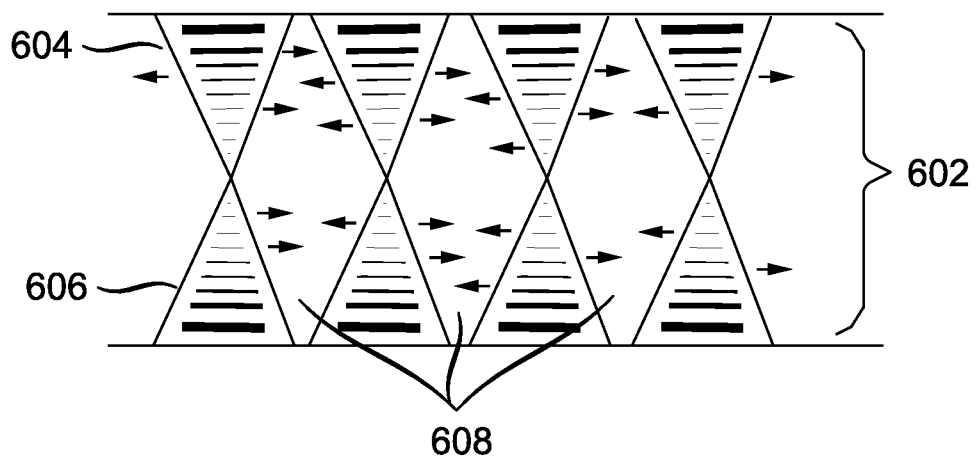
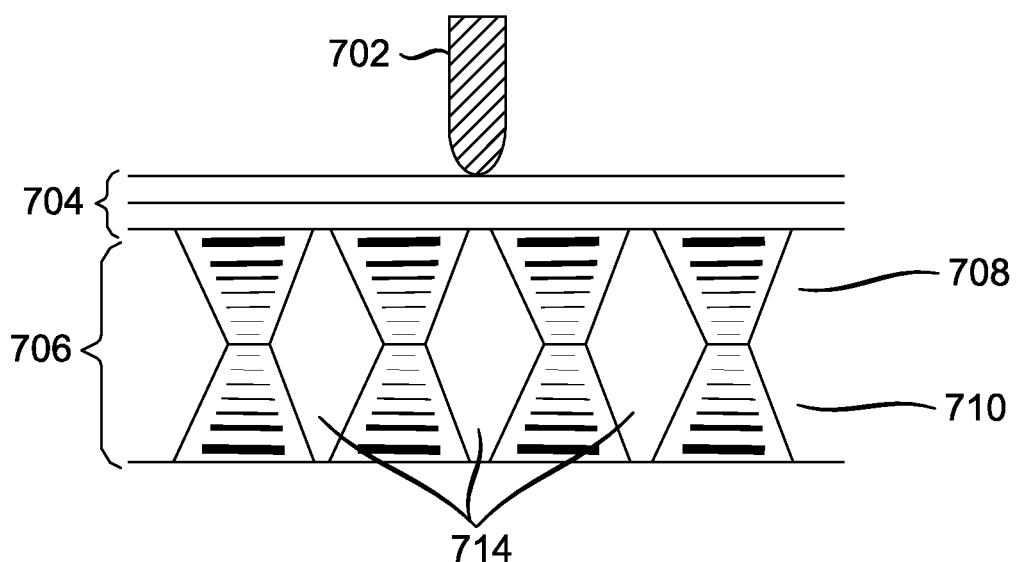

HELMET DESIGNS UTILIZING FOAM STRUCTURES HAVING GRADED PROPERTIES

PRIORITY

This application claims priority to U.S. Provisional Patent Application No. 61/442,469, filed 14 Feb. 2011, the contents of which are herein incorporated by reference in their entirety.

BACKGROUND

1. Technical Field

The present disclosure relates to safety helmet design and more specifically to reducing kinetic energy transmission after various types of impacts by utilizing foam structures having graded properties.

2. Introduction

In the United States, hundreds of thousands of people each year are involved in athletic, cycling or motorcycle accidents resulting in head injury. Much of the subsequent damage is caused by the transmission of kinetic energy to the brain, as well as shear forces. Although existing bicycle helmets reduce deaths and brain injuries, current designs focus more on aesthetics and aerodynamic performance than safety, in part due to market demands. In addition, the helmet industry is essentially self-regulating and therefore not likely to make significant improvements to helmets unless the improvements prove to be cost-effective and/or markedly more effective. Advances in polymeric materials provide novel approaches to helmet design and construction. Significant improvements in viscoelastic (active) dampening, low loss elastomers, and gradient rigidity materials have already given rise to enhanced athletic equipment and protective gear.

Crashes and impacts to the head in sports often result in head trauma due to the rigid construction of helmets. The severe consequences of concussive brain injuries have become increasingly recognized in many sports, particularly recently in professional football and ice hockey. It has also long been recognized that boxers often suffer significant cognitive decline, even in non-professional contests where protective head gear is required. Professional and college sports teams would likely switch to a new type of helmet, if such a design were clearly shown to reduce post-traumatic brain injury.

In addition to athletics, improved helmet designs have applications in the military. Brain injury is the leading cause of disability for military personnel deployed in Iraq and Afghanistan. Although military helmet designs have improved in recent years, they are intended primarily to prevent missile/shrapnel penetration, and do little to reduce the energy transmitted to the brain, which is a major contributor to subsequent disability. The mechanisms of traumatic brain injury due to blast forces remain unclear, but brain injuries related to explosives are by far the most common cause of death and disability in Iraq and Afghanistan. Experimental evidence indicates that the use of advanced body armor may contribute to the increase in brain injuries, both by protecting against death from injury to major non-brain organs such as the lung, and possibly by transmitting kinetic energy through larger blood vessels to the brain.

Existing helmet designs do not adequately address the critical problem: kinetic energy from the impact is transmitted to the brain through primary, secondary and tertiary mechanisms—resulting in concussion, brain damage and even death.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is a structure for improved safety helmet design that reduces both the kinetic energy induced by impact and rotational forces utilizing foam structures having graded properties. The safety helmet will better protect the brain by limiting both direct missile trauma and secondary kinetic effects. Distributing the force that a penetrating object applies is typically accomplished by a hard shell. Metals, reinforced Kevlar or fiberglass composites traditionally have accomplished this role, but new composites offer improvement. The main failure of most headgear is that a blunt, distributed force can cause significant trauma if the force is not dissipated in other ways than transmission to the skull. The structure disclosed herein dissipates damaging forces utilizing foam structures having graded properties. In addition to helmet design, the principles disclosed herein can also apply to other types of body armor such as chest protectors and bullet proof vests as well as buildings or other structures exposed to projectiles or explosives. The layering approach distributes the forces laterally and away from the skull based on the structure and interaction between layers in the structure.

The safety helmet receives contact of an object that transfers kinetic energy to a first composite layer and uses a second composite layer, having a first set of expansion structures and a second set of expansion structures, adjacent to the first composite layer designed such that the second composite layer compresses and at least one expansion structure of the first set of expansion structures and the second set of expansion structures expands into an expansion zone in the second composite layer to transfer kinetic energy laterally with respect to the skull. Each expansion structure in the first set of expansion structures has a base configured adjacent to the first composite layer and each expansion structure has a first tip. The second set of expansion structures is configured such that a respective second tip of each expansion structure in the second set of expansion structures is in contact with the first tip of a corresponding expansion structure in the first set of expansion structures in a mirrored configuration.

Expansion structures in the second composite layer can have a graded modulus such that material at the tip of the expansion structure has a low modulus and the modulus in the material increases as it moves from the tip to the base in an expansion structure. An expansion structure can have any suitable compressible material such as foam formulated to have a range of mechanical compression strength.

A safety helmet can have any number of composite layers wherein each composite layer contains a first set of expansion structures and a second set of expansion structures and at least one expansion structure compresses and expands into an expansion zone. Each composite layer can be adjacent to the immediately preceding layer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a side view of safety helmet layers utilizing foam structures having varying sizes;

FIG. 4 illustrates a side view of safety helmet layers utilizing foam structures having varying shapes;

FIG. 5 illustrates an alternate side view of safety helmet layers utilizing foam structures having varying shapes;

FIG. 6 illustrates a side view of safety helmet layers having expansion zones;

FIG. 7 illustrates a side view of a safety helmet layer having a compressed expansion structure.

DETAILED DESCRIPTION

Figure 1:
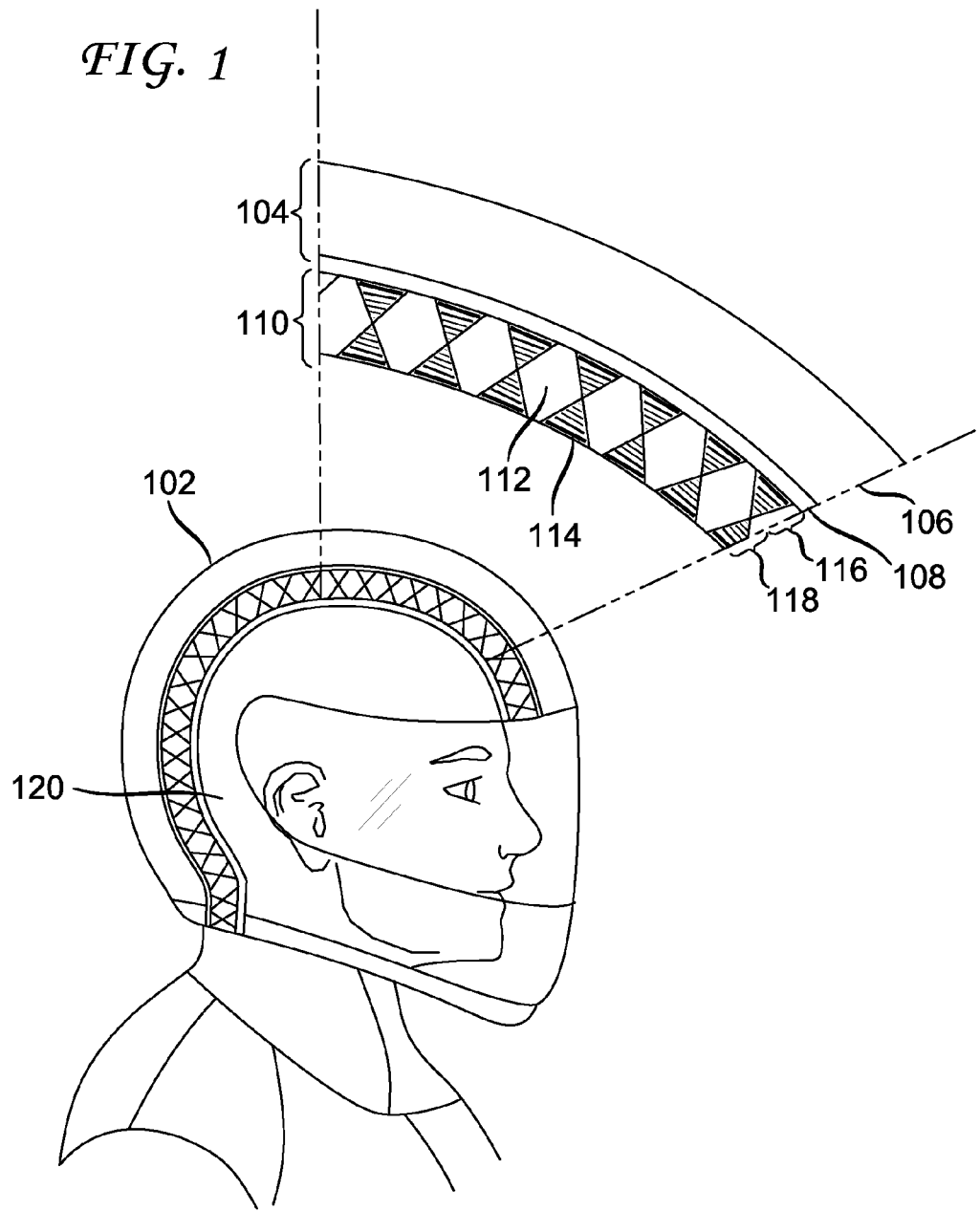
FIG. 1 illustrates a side view of a safety helmet with layers utilizing foam structures.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved safety helmet designs. A safety helmet design is disclosed that reduces both the kinetic energy induced by impact and rotational forces. A brief introductory description of safety helmets is provided followed by a discussion of mathematical modeling used to optimize helmet layer design. A more detailed description of improved safety helmet designs utilizing foam structures having graded properties will then follow. While a helmet is used in the example embodiment, the layering principles can also be applied to a wall, body armor, a vehicle, or any protective layer that could use the principles disclosed herein. Accordingly, various embodiments of the disclosure include a wall having a series of layers and disclosed herein, body armor having the series of layers as well as a vehicle having an outer covering including the series of layers disclosed herein. The disclosure proceeds to discuss primarily a helmet embodiment.

Traditional design for both military and recreational helmets includes a rigid outer material to prevent penetration of the skull and brain, as well as some type of lining material to absorb some of the shock and to enhance comfort. However, few modern designs adequately address the critical problems leading to brain damage: kinetic energy transmitted to the brain and rotation (particularly axial acceleration/deceleration).

By using novel materials and composites that are organized upon mathematically defined principles to maximize the relative dissipation of transmitted kinetic energy, as well as to limit rotational components, the disclosed design for helmets and body armor should markedly reduce posttraumatic brain injuries from various types of insults and impacts. The initial target outcome is a set of disruptive technological advances in helmet design that improve the survivability of impact trauma to the head for use in military and civilian applications.

Stacks of various materials can be used in experiments to determine the abilities of the various materials to dissipate and spread out external forces. Mathematical modeling can be used to extrapolate from experimental data to the behaviors of actual helmets constructed of the various material stacks by constructing local models and constructing local-to-global models.

A local model refers to a mathematical model of a single cylindrical stack. Such a model allows calculation, based upon an exogenous force exerted on the top surface of the stack, the amount of force transmitted to a particular point either internal to the stack or on the surfaces of the stack.

Consider a particular stack on which is imposed a rectangular coordinate system (x, y, z). Further, suppose that the vector function F(x, y, z) represents the magnitude of the force experienced at point (x, y, z) of the stack from a known exogenous impact on the stack. Yet further, suppose that experimental data results in measurement of the value of F(x, y, z) at N particular stack points, say $$(x_i, y_i, z_i)(i=1, \ldots, N)$$

Based on the geometric description of the stack, the properties of the materials composing the stack, and an analysis of the physics of force transmission through the stack, the general mathematical form of the function F(x, y, z), up to a set of parameters. For example, in a simple case, the function might have the form:

$$F(x,y,z)=ax+by+cz$$

a linear function, involving three parameters a, b, c, which must be determined. Generally, the experimental data results in an over-determination of a, b, c, so that no set of values for a, b, c exactly matches the experimental data. The best that can be done is to determine the values of a, b, c is some "optimal fashion"—that is, so that some error function is minimized. The most common such error function is the sum of squares function:

$$E(a, b, c) = \sum_{i=1}^{N} (F(x_i, y_i, z_i) - ax_i - by_i - cz_i)^2$$

In case F(x, y, z) is linear, as in the above example, the determination of a, b, c is just the well-known problem of linear regression analysis. However, in actual practice, the function F may involve more or fewer parameters and is generally highly non-linear, especially for materials with complicated behaviors. In such instances, the error function E is a much more complex function and the problem of minimizing the sums of the squares of the errors is a non-linear optimization problem, which we have had considerable experience addressing.

In order to proceed from the local models to actual helmets configurations, an accepted technique from finite-element analysis can be used, namely subdividing a helmet configuration into a large number of elemental configurations, the analysis of each of which can be handled by a local model, and then analyzing the interaction among adjacent elemental configurations.

For the case of the helmet configurations, the surface of the helmet can be divided into a triangular lattice. Corresponding to each triangle, a triangular prism can be obtained by a radial cut into the helmet along each side of the triangle. Each triangular prism can be regarded as embedded within a circular stack and thus subject to the analysis of a local model, which would allow an assessment of the transmission of forces between adjacent prisms in response to an exogenous force anywhere on the helmet surface.

Of particular interest would be the proportion of the initial energy which is transmitted to the bottom of the prisms, the maximum forces transmitted, and their respective locations. This information can be used to compare the effectiveness of various material stacks and helmet configurations.

Figure 2:
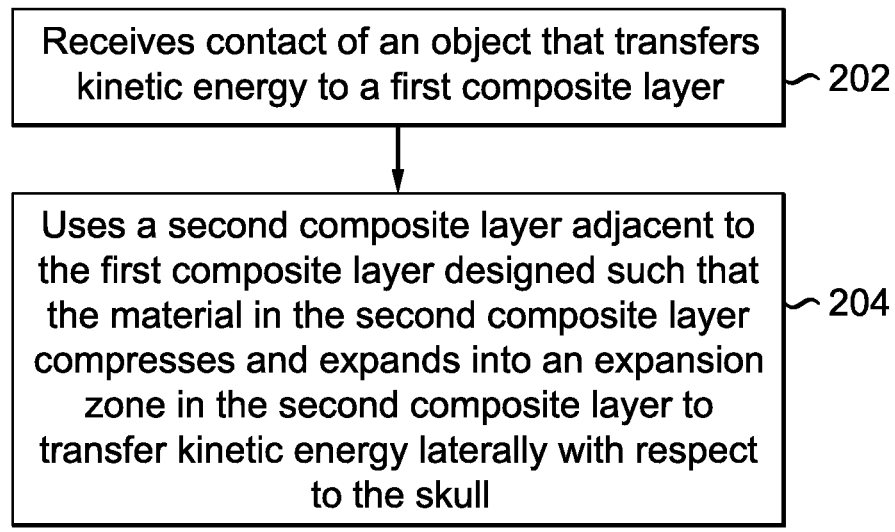
FIG. 2 illustrates an exemplary safety helmet method embodiment.

Having disclosed some mathematical modeling used to optimize helmet layer design, the disclosure now turns to FIG. 1 and FIG. 2. FIG. 1 and FIG. 2 illustrate an improved safety helmet design that reduces both the kinetic energy induced by impact and rotational forces by utilizing foam expansion structures having graded properties. The safety helmet will better protect the brain by limiting both direct missile trauma and secondary kinetic effects. The safety helmet 102 receives contact of an object that transfers kinetic energy to a first composite layer 104, 202; the composite having a polymer matrix 106 and a ceramic reinforcement (a fiber) 108. Alternately, the first composite layer 104 is a composite having a polymer matrix 106 and glass reinforcement 108. A polymer is a large molecule composed of repeating structural units, the units typically connected by covalent chemical bonds. Polymers are both natural and synthetic materials with varying properties. Natural polymeric materials include shellac, and cellulose and synthetic polymers include neoprene, PVC, silicon and more.

The safety helmet uses a second composite layer 110 adjacent to the first composite layer 104 designed such that the second composite layer 110 compresses and expands into an expansion zone 112 in the second composite layer to transfer kinetic energy laterally with respect to the skull 120, 204. The second composite layer has a first set of expansion structures 116 and a second set of expansion structures 118, and at least one expansion structure 114 of the first set of expansion structures and the second set of expansion structures expands into an expansion zone 112 in the second composite layer 110. Each expansion structure in the first set of expansion structures 116 has a base configured adjacent to the first composite layer 104 and each expansion structure has a first tip. The second set of expansion structures 118 is configured such that a respective second tip of each expansion structure in the second set of expansion structures 118 is in contact with the first tip of a corresponding expansion structure in the first set of expansion structures 116 in a mirrored configuration.

Expansion structures in the second composite layer 110 are made of material that deforms under impact with an object to transfer kinetic energy, such as flexible foam or polyurethane or any other material capable of deforming under impact to transfer kinetic energy. The second composite layer 110 serves as an inner shock absorption layer designed to slow or redirect the transfer of force from an impacting object to the head. This is accomplished by slowing the transfer in a graded fashion and/or redirecting some of the load away from the head. The absorption layer 110 can have multiple foam expansion structures with graded physical properties. The graded physical properties can be created from the chemical composition of the foam, by incorporation of different sizes of reinforcements, or by physical shaping of the foam. The foam can be composed of any suitable compressible material formulated to have a range of mechanical compression strength. The expansion structures can have varying sizes and shapes, and can be made of the same or differing materials.

FIG. 3 illustrates a side view of safety helmet layers utilizing foam expansion structures having varying sizes. The first set of expansion structures 304 in the second composite layer 308 has bases adjacent to the first composite layer 302 and the second set of expansion structures 306 in the second composite layer 308 has tips in contact with respective tips of corresponding expansion structures in the first set of expansion structures 302 in a mirrored configuration. The expansion structures can be foam structures made of suitable compressible material having a graded modulus. A modulus is a quantity that expresses the degree to which a substance possesses a property. A graded modulus is a substance containing varying degrees of a physical property. The foam expansion structures have a low modulus at the tips 310 with the modulus in each expansion structure increasing as it moves from the tip 310 to the base 312 such that the modulus is greatest, or the material is the most dense, at the bases 312 of the expansion structures. Alternately, the graded modulus contains material at the tip of the expansion structure having a high modulus and the modulus in each expansion structure decreasing as it moves from the tip to the base of each expansion structure, such that the modulus is the least at the bases of the expansion structures. Additionally, FIG. 3 illustrates exemplary physical shaping of expansion structures. A second composite layer 308 can have a first set of expansion structures having a triangular shape of a first size 304 and can have a second set of expansion structures having a triangular shape of a second size 306. Alternately, expansion structures in the first and the second sets can have the same size.

FIG. 4 and FIG. 5 illustrate side views of safety helmet layers having expansion structures with varying shapes. The second composite layer 402 can have a first set of expansion structures 404 having a rounded tip 406 and a second set of expansion structures 408 having a triangular shape of 410. An alternate second composite layer 502 can have a first set of expansion structures having a triangular shape 504 and a second set of expansion structures having a rectangular shape 506 with a triangular tip. The expansion structures in the composite layers 402, 502 have a low modulus at the tips with the modulus in each expansion structure increasing as it moves from the tip to the base such that the modulus is the greatest at the bases of the expansion structures. Graded physical properties of a foam expansion structure such as chemical composition of the foam, varying sizes of an expansion structure and physical shaping of foam that can transfer kinetic energy laterally with respect to the skull are considered and should not be limiting in any way.

At least one expansion structure in a second composite layer of a helmet 102 compresses such that the expansion structure expands into expansion zones surrounding the expansion structures. FIG. 6 illustrates a side view of a safety helmet layer having a second composite layer 602 with a first set of expansion structures 604 and a second set of expansion structures 606 and expansion zones 608 surrounding the expansion structures. The expansion zones are pockets of air surrounding the expansion structures 608 in the second composite layer. An expansion zone can have of any other chemical composition such as other types of gas such as oxygen and should not be limiting. Prior to impact by an object, the sets of expansion structures 604, 606 are in their natural and uncompressed states and the expansion zones 608 are empty.

FIG. 7 illustrates a side view of a safety helmet having compressed expansion structures. After a safety helmet 102 receives impact by an object 702 that transfers kinetic energy at a first composite layer 704, expansion structures 708, 710 in the second composite layer 706 compresses and material expands into expansion zones 714. An object that delivers a greater impact causes a greater deformation of expansion structures and fills expansion zones more than an object that delivers a lesser impact. The safety helmet transfers kinetic energy laterally with respect to the skull into expansion zones to absorb impact from the object 702 instead of directly to the skull.

Figure 8:
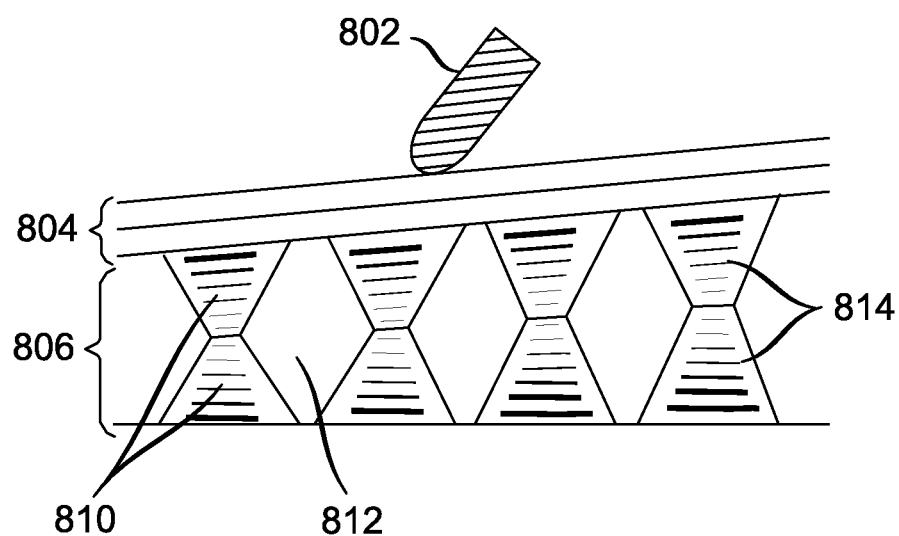
FIG. 8 illustrates a side view of a safety helmet having partially compressed expansion structures.

FIG. 8 illustrates a side view of a safety helmet having partially compressed expansion structures. In one embodiment, expansion structures compress at varying degrees. After a safety helmet 102 receives impact by an object 802 that transfers kinetic energy at a first composite layer 804, expansion structures 810 in the second composite layer 806 compresses and material expands into expansion zones 812. Expansion structures 810 in the second composite layer 806 closest to the impacting object 802 can receive the greatest amount of force by the object and can compress the greatest compared to expansion structures 814 further from the impacting object 802.

A safety helmet utilizing foam having graded properties can have a first composite layer 104 that comes in direct contact with an object, such as shrapnel from an exploded road-side bomb. The first composite layer 104 can have a ceramic reinforcement 106 and a polymer matrix 108. The second composite layer 110 can have a first set of expansion structures 116 having a triangular shape of a first size and can have a second set of expansion structures 118 having a triangular shape of a second size, wherein the first and second sizes are equal. The structures compress and expand into an expansion zone 112 after impact with the shrapnel. The shock absorbing second composite layer 110 redirects the transfer of force from the impacting object, in this case shrapnel, to the head by transferring the force to the foam expansion structures, moving the force laterally with respect to the skull instead of inward toward the head.

In one embodiment, a safety helmet utilizing foam structures having graded properties can have any number of composite layers wherein each composite layer contains a first set of expansion structures and a second set of expansion structures and at least one expansion structure compresses and expands into an expansion zone upon impact with an object that transfers kinetic energy. Each composite layer can be adjacent to the immediately preceding layer. For example, a safety helmet can have three layers, wherein the first composite layer can have a ceramic reinforcement and polymer matrix and serve as first contact with an object. A second composite layer adjacent to the first composite layer can have a first set of expansion structures having a triangular shape of a first size and can have a second set of expansion structures having a triangular shape of a second size. A third composite layer adjacent to the second composite layer can have a first set of expansion structures having a triangular shape of a third size and can have a second set of expansion structures having a rectangular shape with a triangular-shaped tip. Upon impact with an object that transfers kinetic energy, expansion structures in the second and third composite layers compress and expand into surrounding expansion zones. In this way, force delivered by an object is transferred to foam expansion structures in the second and third composite layers by moving the force laterally instead of directly to the head. Any number of composite layers having expansion structures is contemplated such as five, seven or nine.

The various embodiments described above are provided by way of illustration only and should not be construed to limit the scope of the disclosure. Thus, for a claim that recites a structure that deflects and spreads kinetic energy, the structure could apply in any application disclosed herein (vehicle, helmet, body armor, building protection, etc.) as well as other structures not listed. Those skilled in the art will readily recognize various modifications and changes that may be made to the principles described herein without following the example embodiments and applications illustrated and described herein, and without departing from the spirit and scope of the disclosure.

We claim:

1. A structure for reducing kinetic energy transmission, the structure comprising:
    a first composite layer configured as an outside layer that serves as first contact with a source of kinetic energy; and
    a second composite layer, adjacent to the first composite layer comprising a first plurality of triangular expansion structures in which each expansion structure of the first plurality of triangular expansion structures has a base configured adjacent to the first composite layer and each expansion structure having a first tip, and a second plurality of triangular expansion structures configured such that a respective second tip of each expansion structure of the second plurality of triangular expansion structures is in contact with the first tip of a corresponding expansion structure of the first plurality of triangular expansion structures in a mirrored configuration, such that when the source comes in contact with the first composite layer, the second composite layer compresses and at least one expansion structure of the first plurality of triangular expansion structures and the second plurality of triangular expansion structures expands into an expansion zone in the second composite layer.

2. The structure of claim 1, wherein the first composite layer comprises a composite of at least two materials.

3. The structure of claim 2, wherein the composite has a polymer matrix and a ceramic reinforcement.

4. The structure of claim 2, wherein the composite has a polymer matrix and a glass reinforcement.

5. The structure of claim 3, wherein the ceramic reinforcement is a fiber.

6. The structure of claim 1, wherein the second composite layer comprises material that deforms under impact to transfer kinetic energy.

7. The structure of claim 1, wherein the first plurality of triangular expansion structures and the second plurality of triangular expansion structures each comprises expansion structures having a graded modulus.

8. The structure of claim 7, wherein the graded modulus comprises material at the tip of the expansion structure having a low modulus and the modulus in each expansion structure increasing as it moves from the tip to the base of each expansion structure.

9. The structure of claim 7, wherein the graded modulus comprises material at the tip of the expansion structure having a high modulus and the modulus in each expansion structure decreasing as it moves from the tip to the base of each expansion structure.

10. The structure of claim 1, wherein the expansion structures are comprised of flexible foam.

11. The structure of claim 10, wherein the foam is comprised of polyurethane.

12. The structure of claim 1, wherein the expansion structures in the expansion structure have the same shape.

* * * * *